H. HARRISON.
Machines for Upsetting Tires.

No. 157,393. Patented Dec. 1, 1874.

Witnesses:
E. B. Gintzenich
Geo. B. Selden.

Inventor:
H. Harrison
By Wm. S. Loughborough
Atty

THE GRAPHIC CO. PHOTO-LITH. 39 & 41 PARK PLACE, N.Y.

UNITED STATES PATENT OFFICE.

HARRY HARRISON, OF GENESEO, NEW YORK.

IMPROVEMENT IN MACHINES FOR UPSETTING TIRES.

Specification forming part of Letters Patent No. 157,393, dated December 1, 1874; application filed March 31, 1873.

*To all whom it may concern:*

Be it known that I, HARRY HARRISON, of Geneseo, in the county of Livingston and State of New York, have invented certain Improvements in Apparatus for Upsetting Tire, of which the following is a specification:

This invention consists, more especially, in the employment of a segmentally-acting vise or clamp, in combination with the fixed clamp, the former being operated by means of a screw working laterally through a cylindrical or swiveled nut properly fitted in the stock of the apparatus.

Figure 1:
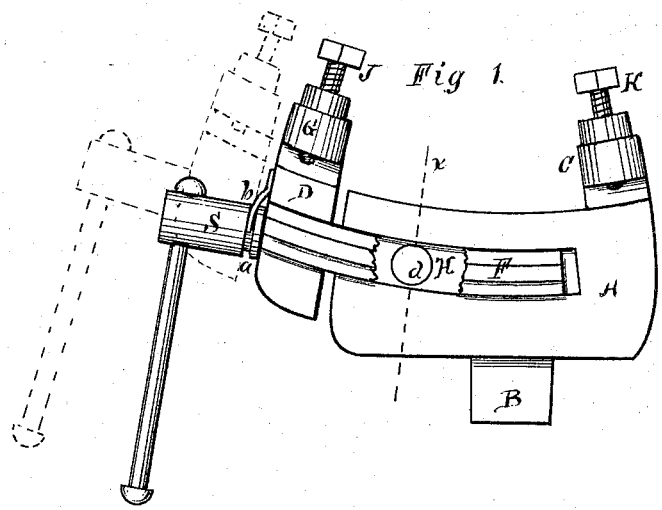
Figure 2:
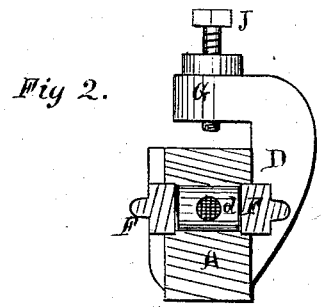

In the drawings, Figure 1 is a front elevation of my invention, showing, in full lines, the apparatus as contracted, and in dotted lines as extended. Fig. 2 is a transverse section on the dotted line $x$ in Fig. 1.

The object of my invention is to provide an efficient device for the purpose of upsetting tire, which shall be simpler and cheaper than those heretofore used.

It is composed of a stock, A, provided with a lug, B, by which it is attached to an ordinary anvil, and an overhanging clamping-jaw, C. This stock is made concave on its upper face. There is a segmental race or recess, H, formed in each side of the stock, the radius of which corresponds to the concavity of the stock. The movable clamp D is provided with two segmental guides or stays, F, fitted to slide in the recesses in the stock A. The clamp D has a clamping-jaw, G, which also overhangs, as shown more fully in Fig. 2. The jaws C and G have binding-screws J and K. The screw S fits loosely through the body of the clamp; but the latter is coupled to it by means of the bifurcated plate $b$, which is fixed to the clamp, and catches in the groove $a$.

It will be seen that when the clamp is extended or withdrawn, as indicated by the dotted lines in Fig. 1, the clamp D is thrown up by the curved guides, and the outer end of the screw is forced upward with it, which is desirable, in order to have the pressure of the screw, while the compression of the tire is being effected, as near to, and as nearly in line with, the tire as possible. This swinging movement of the screw is effected by means of the nut $d$, journaled or made cylindrical transversely to the screw, and parallel, laterally, to the upper face of the stock A.

A follower-plate might be used, if desired, clamped to the inner or concave side of the tire, between the clamps, to prevent the formation of knots or irregularities by the compression or upsetting.

The device is placed upon an anvil with the lug B in the square opening, to which it is fitted. The screw S is turned out so as to extend the clamp more or less, as indicated by the dotted lines in Fig. 1. The tire, when heated, is then secured in the clamps C G by the binding-screws J and K, and a follower-plate being applied, if desired, when the tire is upset to any desired extent by the action of the screw S.

What I claim as my invention is—

The combination of the stationary stock A, with lug B, nut $d$, curved recess H, jaw C, and nut K, with the movable clamp D, with curved guides F, loosely-fitted screw S, jaw G, and screw J, all constructed substantially as and for the purposes set forth.

HARRY HARRISON.

Witnesses:
WM. S. LOUGHBOROUGH,
DANIEL WOOD.